United States Patent [19]

Brewer et al.

[11] Patent Number: 4,697,505
[45] Date of Patent: Oct. 6, 1987

[54] APPARATUS FOR INCREASING THE VISIBILITY OF DISCRETE MORSELS CONTAINED WITHIN A BAKED FOOD PRODUCT

[75] Inventors: Richard A. Brewer, Cincinnati, Ohio; Robert H. Merk, Harrison; Gary J. Orndorff, Sunman, both of Ind.

[73] Assignee: The Procter & Gamble Company, Cincinnati, Ohio

[21] Appl. No.: 912,435

[22] Filed: Sep. 29, 1986

Related U.S. Application Data

[62] Division of Ser. No. 748,517, Jun. 25, 1985, Pat. No. 4,643,904.

[51] Int. Cl.⁴ .......................... A21C 9/04; A23P 1/00
[52] U.S. Cl. .................................. 99/450.1; 99/450.2; 99/494; 425/376 R
[58] Field of Search ............. 99/450.1, 450.2, 450.7, 99/450.8, 494; 426/516, 518, 549, 94, 283, 275; 425/376 R, 377, 308, 310, 312, 315

[56] References Cited

U.S. PATENT DOCUMENTS

| | | |
|---|---|---|
| 1,231,286 | 6/1917 | Newcomb . |
| 1,703,182 | 2/1929 | Tessin . |
| 1,879,327 | 9/1932 | Kremmling . |
| 2,313,060 | 3/1943 | Friedman . |
| 2,566,712 | 9/1951 | Zeun ................................ 99/494 X |
| 3,477,851 | 11/1969 | Benson et al. . |
| 3,572,259 | 3/1971 | Hayashi . |
| 3,676,538 | 7/1972 | Patterson . |
| 3,764,715 | 10/1973 | Henthorn et al. . |
| 3,917,863 | 11/1975 | Kaufman, Jr. et al. . |
| 4,010,284 | 3/1977 | Bellew . |
| 4,028,024 | 6/1977 | Moreland . |
| 4,251,201 | 2/1981 | Krysiak . |
| 4,416,910 | 11/1983 | Hayashi et al. . |
| 4,445,835 | 5/1984 | Wasserbach .................... 426/516 X |
| 4,447,458 | 5/1984 | Poth et al. ......................... 426/275 |
| 4,454,804 | 6/1984 | McCulloch . |
| 4,461,779 | 7/1984 | Peters . |
| 4,469,475 | 9/1984 | Krysiak . |
| 4,494,920 | 1/1985 | Anderson ..................... 425/308 X |
| 4,511,318 | 5/1985 | Kolodesh et al. . |
| 4,528,900 | 7/1985 | Simelunas .................... 99/450.2 X |
| 4,579,744 | 4/1986 | Thulin et al. ..................... 426/283 |

FOREIGN PATENT DOCUMENTS 1084135 4/1984 U.S.S.R. ............... 425/315

Primary Examiner—James Kee Chi
Attorney, Agent, or Firm—John J. Ryberg; E. Kelly Linman; John V. Gorman

[57] ABSTRACT

A method of making a morsel-containing, baked food product that exhibits a high degree of morsel visibility on a preselected surface, which in the case of a ready-to-serve cookie is its top surface. The method includes the steps of forming a continuously-moving dough rope containing randomly-distributed morsels, followed by penetrating the continuously-moving dough rope with means that engage and transversely move a portion of the randomly-distributed morsels to a pre-selected, peripheral area of the dough rope that corresponds to the baked product's pre-selected surface where high morsel visibility is ultimately desired. Thereafter, the continuously-moving dough rope is cut into a series of individual dough preforms that are either immediately baked into the final baked product as in the case of a ready-to-serve cookie, or wrapped in a suitable wrapper and subsequently baked or further sliced and then baked by a consumer at home. In a particularly preferred method, the dough rope is laminated and comprised of one or more inner doughs surrounded by one or more outer doughs.

Also disclosed are several embodiments of apparatus for performing the above-described method in a high-speed manufacturing setting. In one particularly preferred embodiment, one or more reciprocating pins are used to penetrate the continuously-moving dough rope to engage and transversely move a portion of the morsels contained therein to the pre-selected, peripheral area of the dough rope. In another particularly preferred embodiment, one or more disks are utilized.

24 Claims, 8 Drawing Figures

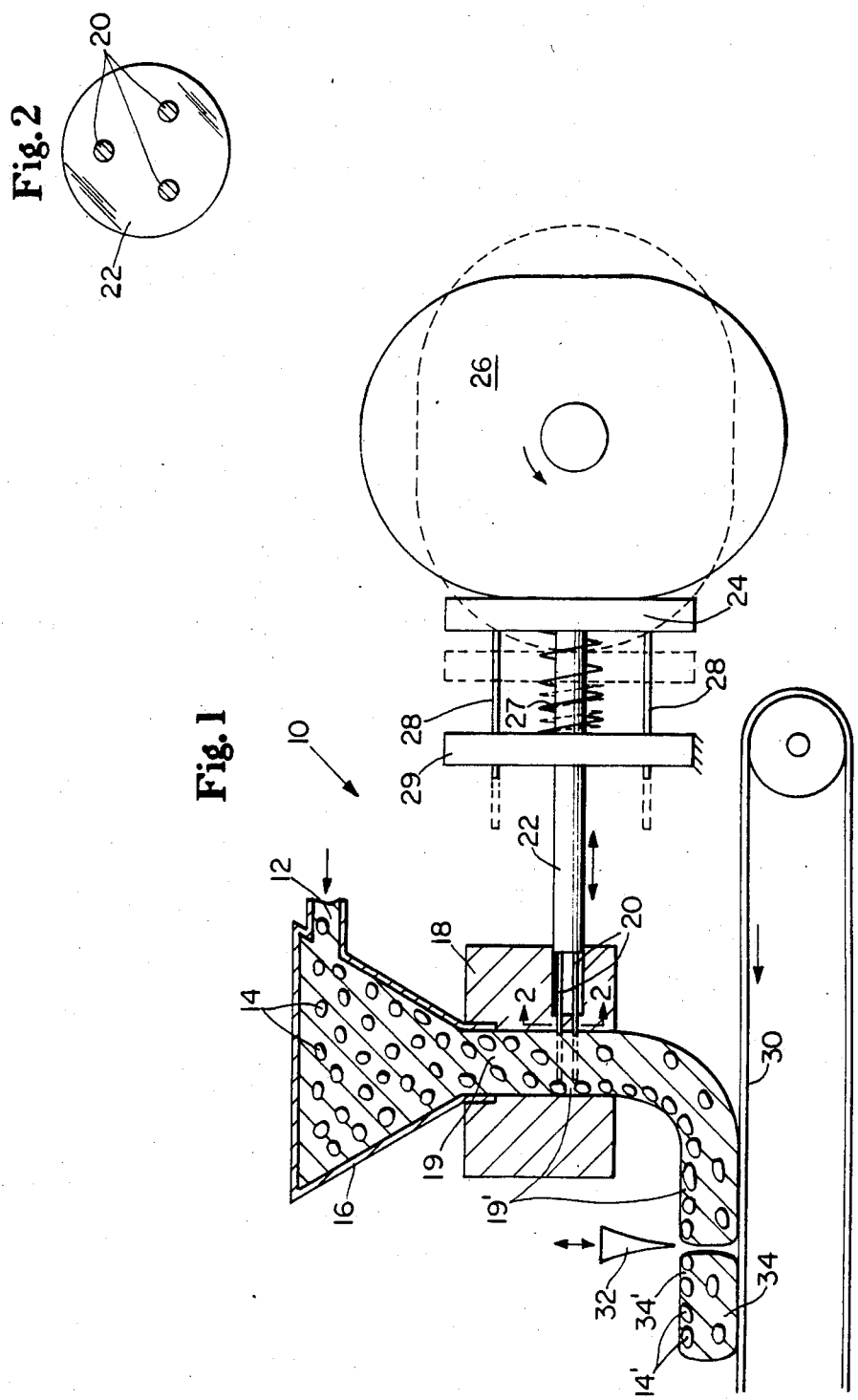

APPARATUS FOR INCREASING THE VISIBILITY OF DISCRETE MORSELS CONTAINED WITHIN A BAKED FOOD PRODUCT

This is a division of application Ser. No. 748,517, filed on June 25, 1985, now U.S. Pat. No. 4,643,904.

TECHNICAL FIELD

The present invention relates to a method and apparatus for making baked food products, and in particular relates to a method and apparatus for increasing the visibility of discrete morsels contained within a baked food product.

BACKGROUND OF THE INVENTION

Food products that contain discrete pieces of edible material (hereinafter referred to as "morsels") are well known in the art. Examples include cookies, cakes, and pastries containing chocolate chips, butterscotch chips, nutmeats, bits of fruit such as raisins, and candies such as M&M's ® or Reeses Pieces ®.

Most high-speed manufacturing methods of making various types of morsel-containing baked food products such as a ready-to-serve chocolate chip cookies typically include the steps of continuously forming a dough rope having morsels randomly-distributed therein, cutting or slicing the dough rope into individual pieces (hereinafter referred to as "dough preforms" or simply "preforms"), and finally baking the dough preforms to preduce individual ready-to-serve cookies. Unfortunately, when such methods are used, the vast majority of the morsels contained within the cookies are not visible upon a casual inspection of the cookies' outer surface. While this is not a serious problem, it has been found that consumers generally prefer a morsel-containing baked product to exhibit a high degree of "morsel show," or in the case of a chocolate chip cookie, a high degree of "chip show."

One possible way of increasing morsel visibility in a baked food product made in a manner as described above would be to sprinkle additional morsels on the dough preform's outer surface prior to baking. However, depending on the degree of tackiness exhibited by the preform's outer surface, most of the morsels would fall off the preform either prior to or during the baking step, thereby creating waste and increasing costs. In addition, the sprinkled-on morsels would tend to melt or "bleed" all over the cookie's outer surface when baked, thereby significantly detracting from the cookie's appearance. On the other hand, such a proposal might be practical if the morsels were somehow pressed into the preform from the outside in before baking, but that would add yet another manipulative, time-consuming step to the process, thereby increasing costs. In addition, such manipulation would severely distort the preform and, ultimately, the final baked product.

High morsel visibility is also generally desirable in the new laminated form of ready-to-serve cookies, examples of which are disclosed in the revolutionary teachings of commonly assigned U.S. Pat. No. 4,455,333, which is hereby incorporated herein by reference. The Hong and Brabbs cookie can be made by, for example, coextruding an inner dough with one or more outer doughs to form a laminated dough preform which, when baked, has different textures and degrees of sugar crystallization. One way of increasing morsel-show on a Hong and Brabbs cookie would be to include randomly-distributed morsels in the cookie's outer dough layer. However, in light of the outer dough's relative thinness and the corresponding coextrusion nozzle's inner dimension limitations, only relatively small morsels could be included in the outer dough layer. Since it has been found that consumers generally prefer much larger morsels, such a solution is not optimal.

In light of the above, the principal object of the present invention is to provide a high-speed manufacturing method of producing various types of baked food products that exhibit a high degree of morsel visibility.

Another principal object of the present invention is to provide a high-speed manufacturing apparatus for producing various types of baked food products that exhibits a high degree of morsel visiblity.

Yet another principal object of the present invention is to provide a high-speed manufacturing method of making various types of dough preforms which when subsequently baked by, for example, a consumer at home in a conventional oven, produce baked food products that exhibit a high degree of morsel visibility.

Another principal object of the present invention is to provide a high-speed manufacturing apparatus for making various types of dough preforms which when subsequently baked by, for example, a consumer at home in a conventional oven, produce baked food products that exhibit a high degree of morsel visibility.

SUMMARY OF THE INVENTION

As used in the following summary and detailed description of the present invention, the term "morsel" is intended to include a wide variety of relatively small, discrete pieces of edible material that are either solid or semi-solid such as, for example only, either naturally or artificially flavored chips such as chocolate, butterscotch, or peanut butter, bits of fruit, nutmeats, cereals, and candies. The term "dough" is intended to mean a mixed combination of those ingredients common to virtually all baked food products, including flour, sugar, shortening, and water. The term "dough preform" or simply "preform" is intended to mean a relatively small, discrete piece of dough that has, for example, been cut or sliced from a dough rope for baking into the final food product. The term is also intended to include a relatively large piece of dough that has been cut or sliced from a dough rope and wrapped in a suitable wrapper for subsequent cutting into yet smaller pieces and baking by, for example, a consumer at home. In addition, although the following summary and detailed description are generally directed to a method and apparatus for making a ready-to-serve cookie, it will be readily apparent to those skilled in the art that the present invention is equally applicable to other areas of the baked products art, including, for example, cakes, rolls, and pastries.

The present invention provides a high-speed method of producing various types of baked food products that exhibit a high degree of morsel visibility on a preselected surface, which in the case of a cookie is its top surface. The method begins by forming a continuously-moving dough rope containing randomly-distributed morsels, followed by penetrating the continuously-moving dough rope with means that engage and transversely move a portion of the randomly-distributed morsels to a pre-selected, peripheral area of the continuously-moving dough rope that corresponds to the baked product's pre-selected surface where high morsel visibility is ultimately desired. Thereafter, the continuously-moving dough rope is cut into a series of relatively small dough preforms that can be either immediately baked into the final product as in the case of a ready-to-serve cookie, or suitably packaged in groups of a dozen or so and sold to consumers for baking. Alternatively, the dough rope can be sliced into a series of relatively large preforms that are individually wrapped in a suitable wrapper and sold to consumers with instructions to further slice the relativey large preform into smaller ones for baking.

In a particularly preferred variation of the above-described method, the continuously-moving dough rope comprises a plurality of distinct, concentrically-formed, dough layers with the inner layer(s) containing randomly-distributed morsels. In such a method, the continuously-moving, laminated dough rope is penetrated with means that engage and transversely move a portion of the randomly-distributed morsels contained within the inner layer(s) to a pre-selected, peripheral area of the laminated dough rope that corresponds to the baked product's pre-selected surface where high morsel visibility is ultimately desired. Thereafter, the continuously-moving dough rope is cut into a series of dough preforms that can be further processed in any of the alternate manners described above.

The present invention also provides a high-speed apparatus that is particularly well suited for performing the above-described process. In a particularly preferred embodiment, a mass of dough containing randomly-distributed morsels is fed under pressure through an extrusion nozzle to form a continuously-moving dough rope. Before the continuously-moving dough rope exits the extrusion nozzle, one or more reciprocating pins penetrate the rope in a direction substantially perpendicular to the dough rope's longitudinal axis. In so doing, the reciprocating pins engage and transversely move a portion of the randomly-distributed morsels to a pre-selected, peripheral area of the dough rope that corresponds to the baked product's pre-selected surface where high morsel visibility is ultimately desired. The pins' size, number, spacing, depth of penetration (throw), and reciprocating frequency are adjustable depending on such variables as morsel size, dough rope size, dough rope extrusion speed, the portion (percentage) of the morsels desired to be moved, and ultimately the desired degree of morsel visibility exhibited by the final baked product's pre-selected surface.

After exiting the extrusion nozzle, the continuously-moving dough rope is gently laid on transporting means such as a conveyor belt and sliced into a series of relatively small, individual dough preforms. The preforms are then transported to either an oven where each one is baked to produce the final product such as a ready-to-serve cookie, or to a packaging station where they are suitably packaged in groups of a dozen or so for subsequent baking by consumers. Alternatively, the dough rope can be cut into a series of relatively large preforms that are individually wrapped in suitable wrappers and sold to consumers with instructions to further slice the large preform into smaller ones for baking.

In another particularly preferred embodiment of the present method and apparatus, distinct masses of outer and inner doughs, the latter containing randomly-distributed morsels, are fed under pressure through a coextrusion nozzle to form a continuously-moving, laminated dough rope. Before the continuously-moving, laminated dough rope exits the coextrusion nozzle, one or more disks penetrate the rope in a direction substantially parallel to the dough rope's longitudinal axis. In so doing, the disks engage and transversely move a portion of the morsels contained within the inner dough(s) to a pre-selected, peripheral area of the laminated dough rope that corresponds to the baked product's pre-selected surface where high morsel visibility is ultimately desired. As with the reciprocating pin embodiment, the disks' number, size, spacing, and depth of penetration are adjustable depending on such variables as morsel size, dough rope diameter, dough rope extrusion speed, the portion (percentage) of the morsels desired to be moved, and ultimately the desired amount of morsel visibility exhibited by the final product. In addition, the disks may either rotate or remain static, each version having its own advantages which will be described further hereinafter.

BRIEF DESCRIPTION OF THE DRAWINGS

While the specification concludes with claims that particularly point out and distinctly claim the present invention, it is believed that the present invention will be better understood by reading the following description with references made to the following drawings in which:

FIG. 1 is a cross-sectional view of a particularly preferred apparatus wherein one or more reciprocating pins are utilized in practicing the present invention.

FIG. 2 is an enlarged cross-sectional view of the pin portion of the apparatus illustrated in FIG. 1, taken along line 2—2.

DETAILED DESCRIPTION

Figure 3:
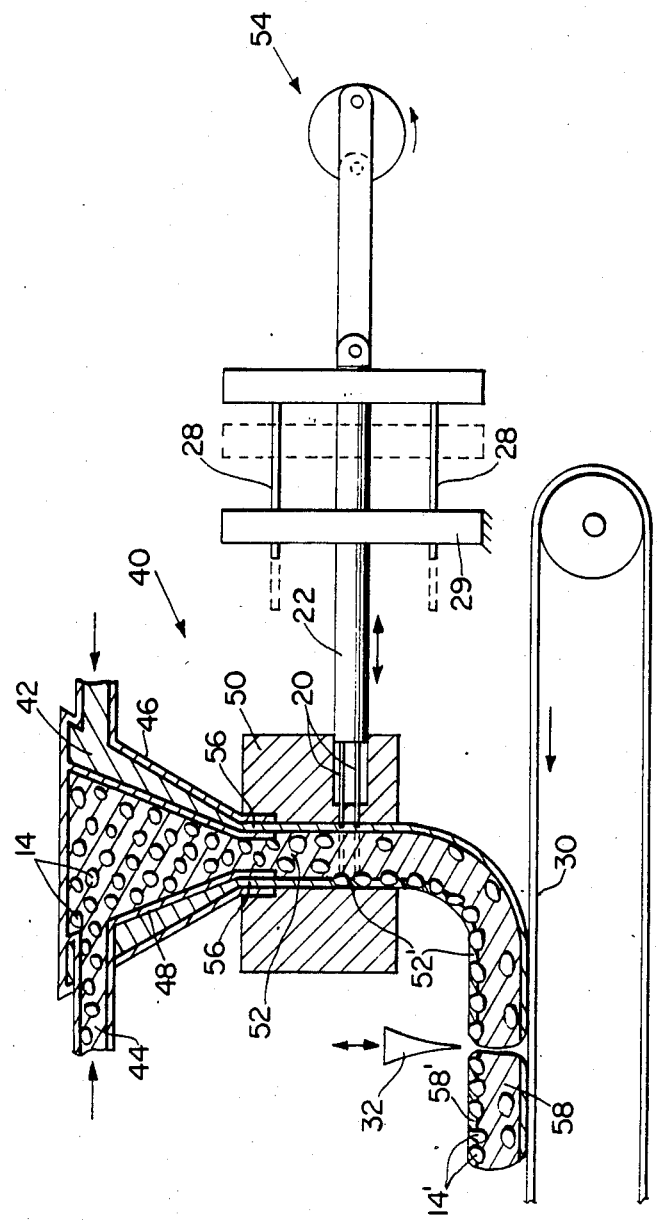
FIG. 3 is a cross-sectional view of another particularly preferred apparatus wherein one or more reciprocating pins are utilized in practicing the present invention, in this case the making of a laminated, morsel-containing baked food product.

In the following detailed description of the present invention, the same numeral is used to indicate common apparatus and workpiece components found in the various embodiments illustrated. In addition, the frame, bearings, supports and the like which must necessarily be provided with respect to the functional members of the disclosed apparatus are not shown in the Figures or described in detail in order to simplify and more clearly depict and disclose the present invention, it being understood that such details are well within the knowledge of those skilled in the art of producing baked food products.

FIG. 1 is a cross-sectional view of a simplified apparatus 10 that can be utilized in practicing the present invention. In operation, dough 12 containing randomly-distributed morsels 14 is fed into upper hopper 16 under modest pressure supplied by variable pressure means (not shown) that is appropriate to the consistency of dough 12, such as an auger, piston pump, or simply gravity. From upper hopper 16, dough 12 flows into an extrusion nozzle schematically represented as 18 wherein dough rope 19 is formed. While dough rope 19 is in the lower portion of extrusion nozzle 18, one or more reciprocating pins 20, the relative size and spacing of which can be seen in the enlarged cross-sectional view of FIG. 2, penetrate dough rope 12 in a manner as described hereinafter. Pins 20, which for obvious reasons should be made from a "food approved" or "food grade" material such as Celcon ® (available from the Celanese Corporation) or Plexiglass ® (available from the Rohm & Haas Corporation), are attached to one end of shaft 22, the other end of which is connected to reciprocating drive means such as follower 24, cam 26 (connected either directly or indirectly to variable speed drive means (not shown) such as an electric motor), return spring 27, guides 28, and guide plate 29.

When cam 26 rotates to the position designated by dotted lines, cam 26 pushes follower 24, shaft 22, guides 28, and pins 20 forward to their respective positions also designated by dotted lines such that pins 20 penetrate dough rope 19 in a direction substantially perpendicular to the dough rope's longitudinal axis. In so doing, pins 20 engage and transversely move a portion of morsels 14 to a pre-selected, peripheral area 19' of dough rope 19, area 19' substantially corresponding to the preselected surface of the final baked product where high morsel visibility is desired. The size, spacing, depth of penetration (throw), and reciprocating frequency of pins 20 are adjustable depending on such variables as morsel size, dough rope size, dough rope extrusion speed, the portion (percentage) of the morsels desired to be moved, and the desired degree of morsel visibility ultimately exhibited by the final baked product. For example, if cam 26 reciprocates a large number of closely-spaced pins 20 at a high frequency, virtually all of morsels 14 contained within dough rope 19 will be transversely moved to peripheral area 19'. Conversely, if cam 26 reciprocates a modest number of widely dispersed pins at a slow frequency, only a small portion of morsels 14 will be transversely moved to peripheral area 19'.

As cam 26 rotates back to its original position, return spring 27 pushes follower 24 along with shaft 22 back to their original positions, thereby retracting pins 20 from dough rope 19. Since dough rope 19 is confined within nozzle 18 under pressure and has a generally fluid-like consistency, the voids or "wounds" created in dough rope 19 by reciprocating pins 20 tend to close or "heal" almost immediately, thereby leaving little or no trace of "pin holes." Cam 26 and pins 20 continue to rotate and reciprocate, respectively, in the above-described manner as more dough is fed through nozzle 18.

Upon exiting extrusion nozzle 18, dough rope 19 is gently laid on moving conveyor belt 30 and carried to a point downstream where reciprocating knife 32 slices dough rope 19 into a series of individual dough preforms 34. Thereafter, conveyor belt 30 carries dough preforms 34 either to an oven (not shown) where they are baked into the final product followed by suitable packaging for sale to consumers, or to a packaging station (also not shown) where they are suitably packaged in groups of a dozen or so for subsequent baking by consumers. Alternatively, dough rope 19 can be sliced into a series of relatively large preforms (not shown) that are individual wrapped in a suitable wrapper and sold to consumers with instructions to further slice the relatively large preform into smaller ones for baking. In either case, since each preform 34 has a high concentration of morsels 14' at or near its peripheral area 34', the final product produced by baking preform 34 will exhibit a corresponding high degree of morsel visibility on its surface that corresponds to area 34'.

Referring now to FIG. 3, there is illustrated an apparatus 40 which can be used in giving a laminated cookie such as the Hong and Brabbs type described in U.S. Pat. No. 4,455,333 a high degree of morsel visibility or "chip show." In FIG. 3, outer dough 42 and inner dough 44, the latter containing randomly-distributed morsels 14, are fed into upper hoppers 46 and 48, respectively, under modest pressure. From hoppers 46 and 48, doughs 42 and 44 flow into the upper portion of coextrusion nozzle 50 where they are brought together to form a laminated dough rope 52. A particularly preferred example of coextrusion nozzle 50 is Model DDP200-900S, which is available from Bepex-Hutt of Leingarten, West Germany. Before laminated dough rope 52 exits coextrusion nozzle 50, reciprocating pins 20 penetrate rope 52 as described hereinafter. Pins 20 are connected to reciprocating means comprising a shaft 22, guides 28, guide plate 29, and a rotating slider crank mechanism, generally indicated as 54, that is either directly or indirectly connected to variable speed drive means (not shown) such as an electric motor.

When slider crank 54 rotates to the position designated by dotted lines, shaft 22, guides 28, and pins 20 move forward to their respective positions as also designed by dotted lines such that pins 20 penetrate laminated dough rope 52 in a manner substantially perpendicular to the dough rope's longitudinal axis. In so doing, pins 20 engage and transversely move a portion of morsels 14 contained within inner dough 44 to a pre-selected, peripheral area 52' of laminated dough rope 52, area 52' substantially corresponding to the final baked product's pre-selected surface where high morsel visibility is desired. As with apparatus 10 illustrated in FIG. 1, the number, size, spacing, throw, and reciprocating frequency of pins 20 are adjustable depending on such variables as morsel size, dough rope size, and, ultimately, the degree of morsel visibility desired in the final baked food product.

When slider crank mechanism 54 returns to its original position, shaft 22 retracts pins 20 from laminated dough rope 52. Since laminated dough rope 52 is confined within coextrusion nozzle 50 under pressure and has a generally fluid-like consistency, the voids or "wounds" created in laminated dough rope 52 by reciprocating pins 20 tend to close or "heal" almost immediately, thereby leaving little or no trace of "pin holes." Slider crank 54 and pins 20 continue to rotate and reciprocate, respectively, in the above-described manner as more dough is fed through coextrusion nozzle 50.

Upon exiting coextrusion nozzle 50, laminated dough rope 52 is gently laid on moving conveyor belt 30 and carried to a point downstream where reciprocating knife 32 slices rope 52 into a series of individual laminated dough preforms 58. Thereafter, conveyor belt 30 carries laminated dough preforms 58 to either an oven (not shown) where they are baked into the final product followed by suitable packaging for sale to consumers, or to a packaging station where they are suitably packaged in groups of a dozen or so for subsequent baking by consumers. Alternatively, laminated dough rope 52 can be sliced into a series of relatively large preforms that are individually wrapped in a suitable wrapper and sold to consumers with instructions to further slice the relatively large preform into smaller ones for baking. In either case, since each preform 58 has a high concentration of morsels 14' at or near its upper peripheral area 58', the final product produced by baking preform 58 will exhibit a corresponding high degree of morsel visibility on its surface that corresponds to area 58'.

As briefly discussed earlier, one possible way of increasing the morsel visibility of a Hong and Brabbs laminated cookie would be to include a high concentration of randomly-distributed morsels in outer dough layer 42. However, as can be seen in FIG. 3, the relative thinness of outer dough layer 42 and the corresponding small gap 56 at the top portion of coextrusion nozzle 50 is such that only very small morsels would pass therethrough. Since it has been found that consumers generally prefer morsels of a much larger size, such a solution is not optimal. Furthermore, even if morsels of a size small enough to fit through gap 56 were used, it is quite possible that several morsels would eventually become trapped in gap 56 after several hours of continuous apparatus operation, thereby requiring the operator to shut down apparatus 40 to disassemble and clean coextrusion nozzle 50.

Figure 4:
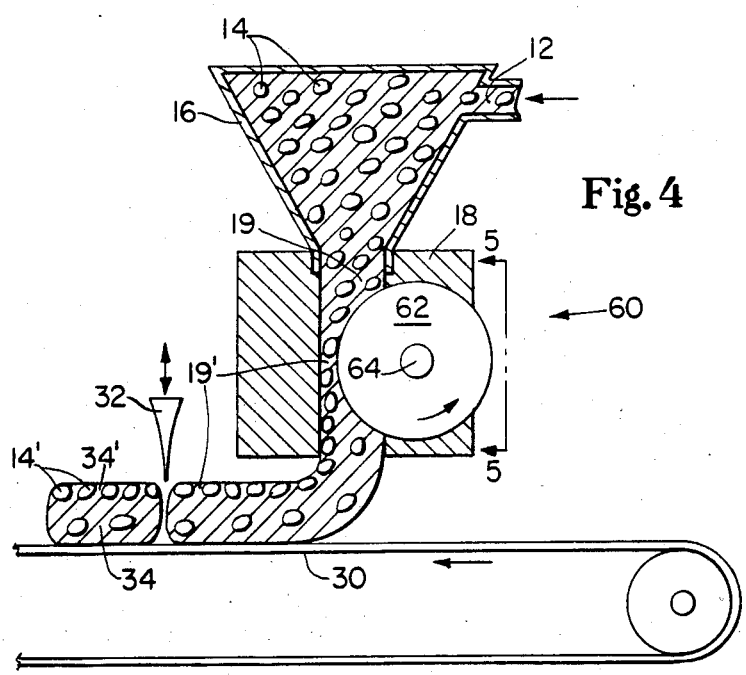
FIG. 4 is a cross-sectional view of a particularly preferred apparatus wherein one or more rotating disks are utilized in practicing the present invention.

FIG. 4 illustrates another particularly preferred embodiment of the present invention. In FIG. 4, apparatus 60 utilizes one or more disks 62 as the means for penetrating dough rope 19 to engage and move a portion of the randomly-distributed, discrete morsels 14 contained therein to a pre-selected, peripheral area 19' of dough rope 19, area 19' substantially corresponding to the pre-selected surface of the final baked product where high morsel visibility is desired. Disks 62 are keyed to shaft 64, which is either directly or indirectly connected to drive means (not shown) such as an electric motor, and continuously rotated so that the relative movement and corresponding friction between dough 12 and disks 62 are minimized. Preferably, disks 62 are made from a "food grade" material such as stainless steel, Celcon ®, or Plexiglass ®.

Figure 5:
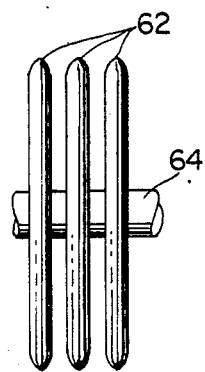
FIG. 5 is an enlarged cross-sectional view of the disk portion of the apparatus illustrated in FIG. 4, taken along line 5—5.

In operation, dough 12 containing randomly-distributed, discrete morsels 14 is fed into upper hopper 16 under modest pressure. From hopper 16, dough 12 flows into an extrusion nozzle schematically represented by 18 wherein dough rope 19 is formed. While dough rope 19 is in the lower section of extrusion nozzle 18, rotating disks 62 penetrate dough rope 19 in a direction substantially parallel to the rope's longitudinal axis. In so doing, disks 62 engage and move a substantial portion of morsels 14 to a pre-selected, peripheral area 19' of dough rope 19, area 19' substantially corresponding to the pre-selected surface of the final baked product where high morsel visibility is desired. As with the "pin" embodiment of the present invention illustrated and described earlier herein, the relative thickness, spacing (see FIG. 5), penetration depth, and rotating speed of disks 62 are adjustable depending on such variables as morsel size, dough rope size, dough rope extrusion speed, the portion (percentage) of the morsel desired to be moved, and the desired degree of morsel visibility ultimately exhibited by the final baked product.

As dough rope continues past rotating disks 62, the slits or "wounds" created in rope 19 by disks 62 start to close or "heal" almost immediately, again since dough rope 19 is confined within nozzle 18 under pressure and has a generally fluid-like consistency. Disks 62 continue to rotate and penetrate dough rope 19 in the above-described manner as more dough is fed through nozzle 18.

Upon exiting extrusion nozzle 18, dough rope 19 is gently laid on conveyor belt 30 and carried to a point downstream where reciprocating knife 32 slices dough rope 19 into a series of individual dough preforms 34. Thereafter, conveyor belt 30 carries dough preforms 34 to either an oven (not shown) where they are baked into the final product such as chocolate chip cookies followed by suitable packaging for sale to consumers, or to a packaging station (also not shown) where they are suitably packaged in groups of a dozen or so for subsequent baking by consumers. Alternatively, dough rope 19 can be sliced into a series of relatively large preforms that are individually wrapped in a suitable wrapper and sold to consumers with instructions to further slice the preform into smaller preforms for baking at home.

With some minor modifications, apparatus 60 illustrated in FIG. 4 can be utilized to produce Hong and Brabbs-type laminated cookies that exhibit a high degree of "chip show." Such a modification would simply include substituting hopper 16 and extrusion nozzle 18 with hoppers 46 and 48 and coextrusion nozzle 50 shown in FIG. 3, respectively, all other components being the same. In such a case, disks 62 would penetrate the laminated dough rope to engage and move a portion of the randomly-distributed morsels contained within the inner dough to a pre-selected, peripheral area of the laminated dough rope, said area substantially corresponding to the pre-selected surface of the final baked product where high morsel visibility is desired.

Figure 6:
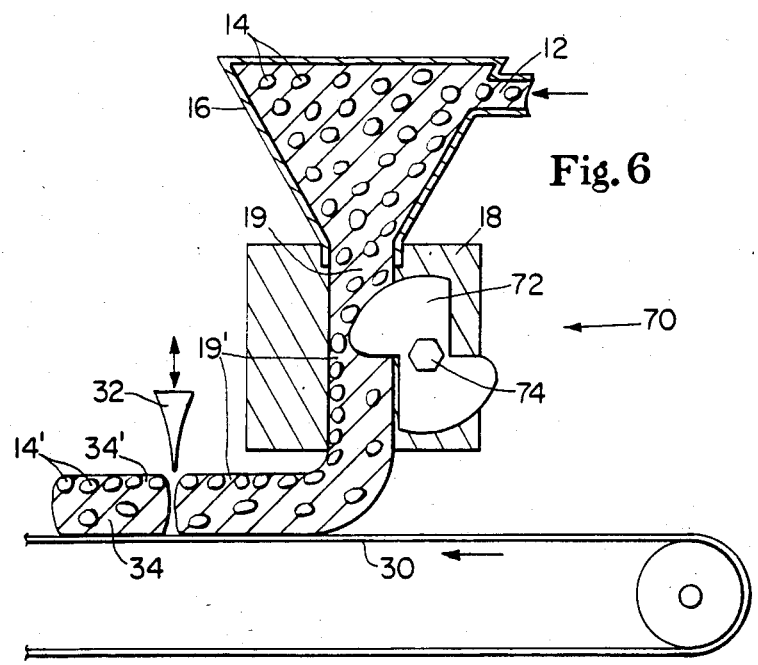
FIG. 6 is a cross-sectional view of a particularly preferred apparatus wherein one or more static partial disks are utilized in practicing the present invention.

FIG. 6 illustrates another particularly preferred embodiment of the present invention that is very similar to apparatus 60 illustrated in FIG. 4. In FIG. 6, apparatus 70 utilizes one or more static disks 72 as the means for engaging and moving a portion of the randomly distributed morsels 14 contained within dough rope 19 to the pre-selected, peripheral area 19' of dough rope 19. Disks 72 are mounted on a shaft (not shown) and held stationary by lock nut 74. Disks 72 are preferably not full circle disks like the ones shown in FIGS. 4 and 5, but rather have a mirror-image, quarter circle shape much like a frontal view of a boat propeller. An obvious advantage in using stationary disks 72 is the elimination of drive means and power necessary to rotate the disks, thereby significantly reducing costs. Another benefit is that disks 72 only penetrate dough rope 19 for a relatively short amount of time and distance as compared to the rotating full disk embodiment, thereby giving the slits or "wounds" created in the dough rope more time to close or "heal" before rope 19 exits extrusion nozzle 18. One potential drawback, however, is that after several hours of continuous operation, a thin film of dough can start to build up on the disks' outer surface. The solution to this minor problem, however, is rather simple: the operator merely stops apparatus 70, loosens lock nut 74 with a conventional wrench, and rotates disk 72 180° such that the "new blade" is now in place. Then, the operator tightens lock nut 74, reenergizes apparatus 70, and prepares for the next "retooling" by cleaning the outer surface of disk 72 with a suitable cleaner.

Figure 7A:
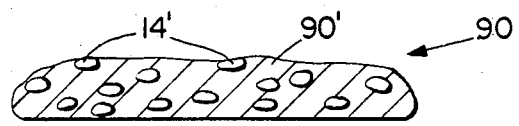
FIG. 7A is a cross-sectional view of a prior art ready-to-serve cookie containing randomly-spaced morsels.
Figure 7B:
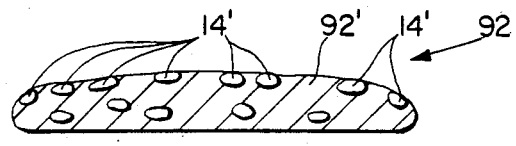
FIG. 7B is a cross-sectional view of a ready-to-serve cookie that was made by the present invention with any of the apparatus shown in FIG. 1, 3, 4, or 6, said ready-to-serve cookie having a high concentration of morsels at or near the cookie's upper peripheral surface and a corresponding high degree of morsel visibility and consumer appeal.

FIG. 7A is a cross-sectional view of a prior art baked food product 90 (in this case, a ready to serve chocolate chip cookie) containing randomly-distributed morsels 14. Of particular significance is the modest number of morsels 14' that are close enough to the upper peripheral area 90' of product 90 to be visible. In contrast, attention is directed to FIG. 7B, which is a cross-sectional view of a chocolate chip cookie that was made by practicing the present invention. In FIG. 7B, chocolate chip cookie 92 has a substantial number of morsels 14' that are at or near the upper peripheral area 92' of cookie 92. In such a cookie, morsels 14' are highly visible much to the delight of consumers.

While several particularly preferred embodiments of the present invention have been described and illustrated, it will be obvious to those skilled in the art that various changes and modifications can be made thereto without departing from the spirit and scope of the invention. Furthermore, although the preceding description of the present invention was generally addressed to making a ready-to-serve cookie exhibiting a high degree of "chip-show", the present invention can be applied with equal facility to any type of morsel-containing baked food product wherein a high degree of morsel visibility is desired. Accordingly, the following claims are intended to embrace such changes, modifications, and areas of application that are within the scope of this invention.

What is claimed is:

1. An apparatus for making individual dough preforms, each containing discrete morsels and having a pre-selected peripheral area wherein the concentration of said morsels is higher than the remainder of said preform, said apparatus comprising:
   (a) means for forming a continuously-moving dough rope containing randomly-distributed morsels, said continuously-moving dough rope having a pre-selected peripheral area and a remainder area;
   (b) means for penetrating said continuously-moving dough rope to engage and transversely move a portion of said randomly-distributed morsels contained within said remainder area of said continuously-moving dough rope to said pre-selected peripheral area of said continuously-moving dough rope, whereby said pre-selected peripheral area of said continuously-moving dough rope has a higher concentration of said morsels than said remainder area of said continuously-moving dough rope; and
   (c) means for cutting said continuously-moving dough rope into said individual dough preforms.

2. The apparatus recited in claim 1 wherein said means for forming a dough rope comprises an extrusion nozzle.

3. The apparatus recited in claim 1 wherein said means for penetrating said dough rope comprises at least one reciprocating pin that penetrates said dough rope in a direction substantially perpendicular to the longitudinal axis of said dough rope.

4. The apparatus recited in claim 1 wherein said means for penetrating said dough rope comprises at least one disk that penetrates said dough rope in a direction substantially parallel to the longitudinal axis of said dough rope.

5. The apparatus recited in claim 4 wherein said at least one disk is held stationary.

6. The apparatus recited in claim 4 wherein said at least one disk rotates.

7. An apparatus for making individual laminated dough preforms, each containing discrete morsels and having a pre-selected peripheral area wherein the concentration of said morsels is higher than the remainder of said laminated preform, said apparatus comprising:
   (a) means for forming a continuously-moving laminated dough rope having at least one inner dough and at least one outer dough wherein said at least one inner dough contains randomly-distributed morsels, said continuously-moving laminated dough rope having a pre-selected peripheral area and a remainder area;
   (b) means for penetrating said continuously-moving laminated dough rope to engage and transversely move a portion of said randomly-distributed morsels contained within said at least one inner dough to said pre-selected peripheral area of said continuously-moving laminated dough rope, whereby said pre-selected peripheral area of said continuously-moving laminated dough rope has a higher concentration of said morsels than said remainder area of said continuously-moving laminated dough rope; and
   (c) means for cutting said continuously-moving laminated dough rope into said individual laminated dough preforms.

8. The apparatus recited in claim 7 wherein said means for forming a laminated dough rope comprises a coextrusion nozzle.

9. The apparatus recited in claim 7 wherein said means for penetrating said dough rope comprises at least one reciprocating pin that penetrates said laminated dough rope in a direction substantially perpendicular to the longitudinal axis of said laminated dough rope.

10. The apparatus recited in claim 7 wherein said means for penetrating said laminated dough rope comprises at least one disk that penetrates said laminated dough rope in a direction substantially parallel to the longitudinal axis of said laminated dough rope.

11. The apparatus recited in claim 10 wherein said at least one disk is held stationary.

12. The apparatus recited in claim 10 wherein said at least one disk rotates.

13. An apparatus for making baked food products, each containing discrete morsels and having a pre-selected peripheral area wherein the concentration of said morsels is greater than the remainder of said baked food product, said apparatus comprising:
   (a) means for forming a continuously-moving dough rope containing randomly-distributed morsels, said continuously-moving dough rope having a pre-selected peripheral area and a remainder area;
   (b) means for penetrating said continuously-moving dough rope to engage and transversely move a portion of said randomly-distributed morsels contained within said remainder area of said continuously-moving dough rope to said pre-selected peripheral area of said continuously-moving dough rope, whereby said pre-selected peripheral area of said continuously-moving dough rope has a higher concentration of said morsels than said remainder area of said continuously-moving dough rope; and
   (c) means for cutting said continuously-moving dough rope into individual dough preforms; and
   (d) means for baking said individual dough preforms to produce said baked food products.

14. The apparatus recited in claim 13 wherein said means for forming a continuously-moving dough rope comprises an extrusion nozzle.

15. The apparatus recited in claim 13 wherein said means for penetrating said continuously-moving dough rope comprises at least one reciprocating pin that penetrates said dough rope in a direction substantially perpendicular to the longitudinal axis of said dough rope.

16. The apparatus recited in claim 13 wherein said means for penetrating said dough rope comprises at least one disk that penetrates said dough rope in a manner substantially parallel to the longitudinal axis of said dough rope.

17. The apparatus recited in claim 16 wherein said at least one disk is held stationary.

18. The apparatus recited in claim 16 wherein said at least one disk rotates.

19. An apparatus for making laminated baked food products, each containing discrete morsels and having a pre-selected peripheral area wherein the concentration of said morsels is greater than the remainder of said baked food product, said apparatus comprising:
 (a) means for forming a continuously-moving laminated dough rope having at least one inner dough and at least one outer dough wherein said at least one inner dough contains randomly-distributed morsels, said continuously-moving laminated dough rope having a pre-selected peripheral area and a remainder area;
 (b) means for penetrating said continuously-moving laminated dough rope with means that engage and transversely move a portion of said randomly-distributed morsels contained within said at least one inner dough to said pre-selected peripheral area of said continuously-moving laminated dough rope, whereby said pre-selected peripheral area of said continuously-moving laminated dough rope has a higher concentration of said morsels than said remainder area of said continuously-moving laminated dough rope; and
 (c) means for cutting said continuously-moving laminated dough rope into individual laminated dough preforms; and
 (d) means for baking said individual laminated dough preforms to produce said laminated baked food products.

20. The apparatus recited in claim 19 wherein said means for forming a continuously-moving laminated dough rope comprises a coextrusion nozzle.

21. The apparatus recited in claim 19 wherein said means for penetrating said continuously-moving laminated dough rope comprises at least one reciprocating pin that penetrates said laminated dough rope in a direction substantially perpendicular to the longitudinal axis of said laminated dough rope.

22. The apparatus recited in claim 19 wherein said means for penetrating said continuously-moving laminated dough rope comprises at least one disk that penetrates said laminated dough rope in a manner substantially parallel to the longitudinal axis of said laminated dough rope.

23. The apparatus recited in claim 22 wherein said at least one disk is held stationary.

24. The apparatus recited in claim 22 wherein said at least one disk rotates.

* * * * *

UNITED STATES PATENT AND TRADEMARK OFFICE
CERTIFICATE OF CORRECTION

PATENT NO. : 4,697,505

DATED : October 6, 1987

INVENTOR(S) : Richard A. Brewer, Robert H. Merk, Gary J. Orndorff

It is certified that error appears in the above-identified patent and that said Letters Patent is hereby corrected as shown below:

Column 1, line 25, "cookies" should read -- cookie --.

Column 1, line 31, "preduce" should read -- produce --.

Column 2, line 15, "visiblity" should read -- visibility --.

Column 3, line 9, "relativey" should read -- relatively --.

Column 6, line 5, "individual" should read -- individually --.

Signed and Sealed this

Sixteenth Day of February, 1988

Attest:

DONALD J. QUIGG

Attesting Officer

Commissioner of Patents and Trademarks